United States Patent
Mizuno

(10) Patent No.: US 6,733,916 B2
(45) Date of Patent: May 11, 2004

(54) METHOD OF MANUFACTURING FUEL CELLS AND FUEL CELLS MANUFACTURED BY THE METHOD

(75) Inventor: Seiji Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/196,683

(22) Filed: Nov. 20, 1998

(65) Prior Publication Data

US 2001/0049047 A1 Dec. 6, 2001

(30) Foreign Application Priority Data

Nov. 21, 1997 (JP) .............................................. 9-338121

(51) Int. Cl.⁷ .......................... H01M 2/08; H01M 8/02; H01M 8/10
(52) U.S. Cl. ............................. 429/36; 429/30; 429/35; 29/623.4
(58) Field of Search .............................. 429/30, 35, 36; 29/623.4

(56) References Cited

U.S. PATENT DOCUMENTS

| | | | | |
|---|---|---|---|---|
| 4,804,451 A | * | 2/1989 | Palmer | 204/633 |
| 5,284,718 A | * | 2/1994 | Chow et al. | 429/26 |
| 5,328,816 A | * | 7/1994 | Tamura et al. | 430/495 |
| 5,636,098 A | * | 6/1997 | Salfelder et al. | 361/234 |
| 5,989,741 A | * | 11/1999 | Bloomfield et al. | 429/32 |
| 6,044,842 A | * | 4/2000 | Pereira et al. | 128/202.27 |
| 6,080,503 A | * | 6/2000 | Schmid et al. | 429/30 |

FOREIGN PATENT DOCUMENTS

| | | | |
|---|---|---|---|
| JP | 5-234606 | | 9/1993 |
| JP | 6-119930 | | 4/1994 |
| JP | 7-249417 | * | 9/1995 |
| JP | 9-199145 | | 7/1997 |

OTHER PUBLICATIONS

"Shore (Durometer) Hardness Testing of Plastics," [online]. MatWeb, 1997 [retrieved on Dec. 30, 2001]. Retrieved from the Internet: <URL: www.matweb.com/measurements/shore–hardness.htm>.*

"Overview—Thermoset Polyurethane, Adhesive." Datasheet [online]. MatWeb, 1997 [retrieved on Dec. 30, 2001]. Retrieved from the Internet: <URL: www.matweb.com/SpecificMaterial.asp?bassnum=O5003&group=General>.*

"Overview—Epoxy Adhesive." Datasheet [online]. MatWeb, 1997 [retrieved on Dec. 30, 2001]. Retrieved from the Internet: <URL: www.matweb.com/SpecificMaterial.asp?bassnum=O1770&group=General>.*

"Overview—Silicone, RTV, Adhesive/Sealant Grade." Datasheet [online]. MatWeb, 1997 [retrieved on Dec. 30, 2001]. Retrieved from the Internet: <URL: www.matweb.com/SpecificMaterial.asp?bassnum=O5200&group=General>.*

* cited by examiner

Primary Examiner—Bruce F. Bell
Assistant Examiner—Jonathan Crepeau
(74) Attorney, Agent, or Firm—Kenyon & Kenyon

(57) ABSTRACT

The method of the present invention enhances the adhesive strength of a polymer electrolyte film via an adhesive and thereby manufactures a fuel cell having a high reliability for a gas sealing property. The method provides a pair of separators and applies an adhesive on specific areas of the separators, which are directly joined with the polymer electrolyte film. The adhesive used here is a modified rubber adhesive that is a mixture of epoxy resin and modified silicone and has a modulus of elasticity of not greater than 10 MPa and a durometer A hardness of not greater than 90 after cure. The method subsequently lays the pair of separators upon the joint body and cures the adhesive for bonding the separators directly to the polymer electrolyte film.

13 Claims, 7 Drawing Sheets

METHOD OF MANUFACTURING FUEL CELLS AND FUEL CELLS MANUFACTURED BY THE METHOD

BACKGROUND OF THE INVENTION

1. Field of the Invention

The present invention relates to a method of manufacturing fuel cells by fixing a polymer electrolyte film to a frame. The present invention also pertains to fuel cells manufactured according to this method.

2. Description of the Related Art

The fuel cells convert the chemical energy of a fuel directly to electrical energy. In a general configuration of the fuel cell, a pair of electrodes are arranged across an electrolyte layer. A supply of gaseous fuel containing hydrogen is fed to one electrode, that is, the anode, whereas a supply of oxidizing gas containing oxygen is fed to the other electrode, that is, the cathode. The fuel cells of this structure generate an electromotive force through the electrochemical reactions proceeding on the anode and the cathode. One major problem of the fuel cells is that the mixture of the gaseous fuel and the oxidizing gas fed to the respective electrodes lowers the efficiency of power generation. In the fuel cells, it is accordingly required to prevent the flow of gaseous fuel from being mixed with the flow of oxidizing gas.

Polymer electrolyte fuel cells have a polymer electrolyte film as the electrolyte layer. The polymer electrolyte fuel cells are generally manufactured by laying a large number of unit cells one upon another to form a stuck structure. In each unit cell, a polymer electrolyte film (hereinafter may be simply referred to as electrolyte film) is interposed between a pair of gas diffusion electrodes to form a sandwich-like structure. A pair of gas-impermeable separators are further disposed across the sandwich-like structure. The electrolyte layer separates the flow of gaseous fuel from the flow of oxidizing gas. The separator prevents the flow of gaseous fuel and the flow of oxidizing gas from being mixed with each other in the adjoining unit cells. In the polymer electrolyte fuel cell, in order to prevent the flow of gaseous fuel from being mixed with the flow of oxidizing gas, the electrolyte film is bonded to the separators with an adhesive in each unit cell to ensure the gas sealing property of the electrodes.

Even when an appropriate adhesive is selected by taking into account the materials of the electrolyte film and the separator, the fuel cell manufactured according to the prior art technique may have the insufficient adhesive strength between the polymer electrolyte film and the separator. The insufficient adhesive strength may result in damaging the gas sealing property of the electrodes. This causes the fuel cell manufactured to have the poor reliability for the gas sealing property of the electrodes.

SUMMARY OF THE INVENTION

The object of the present invention is thus to enhance the adhesive strength of a polymer electrolyte film via an adhesive and thereby manufacture a fuel cell having the high reliability for the gas sealing property.

At least part of the above and the other related objects is realized by a first method of manufacturing a fuel cell by fixing a polymer electrolyte film to a frame. The first method includes the steps of: causing the polymer electrolyte film to have a water content of not greater than 4, which is expressed as a molar fraction of $H_2O$; and bonding the polymer electrolyte film to the frame with an adhesive.

In the first method of the present invention, the polymer electrolyte film treated to have the water content (expressed as the molar fraction of $H_2O$) of not greater than 4 is bonded to the frame with the adhesive. As is known, the water content of the polymer electrolyte film varies with a variation in humidity of the atmosphere. The water content of the polymer electrolyte film may abruptly increase according to the relative humidity. In the case where the polymer electrolyte film has a large water content during manufacture of the fuel cell, a large quantity of water molecules are adsorbed by the functional groups in the polymer electrolyte film. This undesirably lowers the adhesive strength of the polymer electrolyte film via the adhesive. The first method of the present invention causes the polymer electrolyte film to have the water content (expressed as the molar fraction of $H_2O$) of not greater than 4. This effectively prevents a large quantity of water molecules from being adsorbed by the functional groups and thereby ensures the sufficient adhesive strength of the polymer electrolyte film via the adhesive.

The first method of the present invention does not lower the adhesive strength of the polymer electrolyte film via the adhesive even when the atmosphere has a high humidity during manufacture. The fuel cell manufactured according to the first method of the present invention has the high reliability for the gas sealing property between the polymer electrolyte film and the frame.

The present invention also provides a second method of manufacturing a fuel cell by fixing a polymer electrolyte film to a frame. The second method includes the steps of: providing an adhesive having a modulus of elasticity of not greater than 10 MPa after cure; and bonding the polymer electrolyte film to the frame with the adhesive.

In the second method of the present invention, the polymer electrolyte film is bonded to the frame with the adhesive having the modulus of elasticity of not greater than 10 MPa after cure. This arrangement enables the adhesive layer between the polymer electrolyte film and the frame to be readily expanded and contracted in the fuel cell thus manufactured. In this fuel cell, even when the polymer electrolyte film is expanded or contracted with a variation in humidity of the atmosphere after the cure of the adhesive, the adhesive layer can follow the expansion or the contraction. This effectively prevents the polymer electrolyte film from being hardened or broken and protects the adhesive layer from the damage.

The fuel cell manufactured according to the second method of the present invention has the high reliability for the gas sealing property between the polymer electrolyte film and the frame even in the service environment of a remarkable humidity change.

The present invention further provides a third method of manufacturing a fuel cell by fixing a polymer electrolyte film to a frame. The third method includes the steps of: providing an adhesive having a durometer A hardness of not greater than 90 after cure; and bonding the polymer electrolyte film to the frame with the adhesive.

In the third method of the present invention, the polymer electrolyte film is bonded to the frame with the adhesive having the durometer A hardness of not greater than 90 after cure. This arrangement enables the adhesive layer between the polymer electrolyte film and the frame to be in a relatively soft state in the fuel cell thus manufactured. In this fuel cell, even when the polymer electrolyte film is expanded or contracted with a variation in humidity of the atmosphere, the adhesive layer can follow the expansion or the contraction. This effectively prevents the polymer electrolyte film from being hardened or broken and protects the adhesive layer from the damage.

Like the second method of the present invention, the fuel cell manufactured according to the third method of the present invention has the high reliability for the gas sealing property between the polymer electrolyte film and the frame even in the service environment of a remarkable humidity change.

In the first method of the present invention, it is preferable that the step of bonding the polymer electrolyte film comprises placing the adhesive having a modulus of elasticity of not greater than 10 MPa after cure and/or a durometer A hardness of not greater than 90 after cure.

Even in the case where the atmosphere has a high humidity during manufacture or in the case where there is a large variation in humidity in the service environment, this configuration ensures the high reliability for the gas sealing property between the polymer electrolyte film and the frame of the fuel cell.

In the second method of the present invention, it is preferable that the step of providing the adhesive comprises providing the adhesive having a durometer A hardness of not greater than 90 after cure. Even in the case where there is a large variation in humidity in the service environment, this configuration ensures the high reliability for the gas sealing property between the polymer electrolyte film and the frame of the fuel cell.

In any of the first through the third methods of the present invention, in accordance with one preferable structure, the step of bonding the polymer electrolyte film comprises providing the frame being a pair of separators that are arranged across a pair of gas diffusion electrodes, between which the polymer electrolyte film is interposed.

In the fuel cell manufactured according to the method of this preferable structure, the polymer electrolyte film separates a flow of gaseous fuel, which is fed to one gas diffusion electrode arranged on one side of the polymer electrolyte film, from a flow of oxidizing gas, which is fed to the other gas diffusion electrode arranged on the other side of the polymer electrolyte film. The separators seal the flows of gaseous fuel and oxidizing gas. This fuel cell ensures the high reliability for the gas sealing property between the polymer electrolyte film and the separators. This arrangement ensures the gas sealing property of the gas diffusion electrodes without using any special elements, such as O-rings.

In any of the first through the third methods of the present invention, the adhesive may be a modified rubber adhesive containing a mixture of epoxy resin and modified silicone. The adhesive may also include resin beads of a predetermined diameter.

The present invention is directed to a first fuel cell, which includes: a frame; and a polymer electrolyte film that has a water content of not greater than 4, which is expressed as a molar fraction of $H_2O$, and is bonded to the frame with an adhesive.

The first fuel cell corresponds to a fuel cell manufactured according to the first method of the present invention discussed above. Like the first method, the first fuel cell ensures the high reliability for the gas sealing property between the polymer electrolyte film and the frame.

The present invention is also directed to a second fuel cell, which includes: a polymer electrolyte film; a frame; and an adhesive that is used to bond the polymer electrolyte film to the frame and has a modulus of elasticity of not greater than 10 MPa after cure.

The second fuel cell corresponds to a fuel cell manufactured according to the second method of the present invention discussed above. Like the second method, the second fuel cell ensures the high reliability for the gas sealing property between the polymer electrolyte film and the frame.

The present invention is further directed to a third fuel cell, which includes: a polymer electrolyte film; a frame; and an adhesive that is used to bond the polymer electrolyte film to the frame and has a durometer A hardness of not greater than 90 after cure.

The third fuel cell corresponds to a fuel cell manufactured according to the third method of the present invention discussed above. Like the third method, the third fuel cell ensures the high reliability for the gas sealing property between the polymer electrolyte film and the frame.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
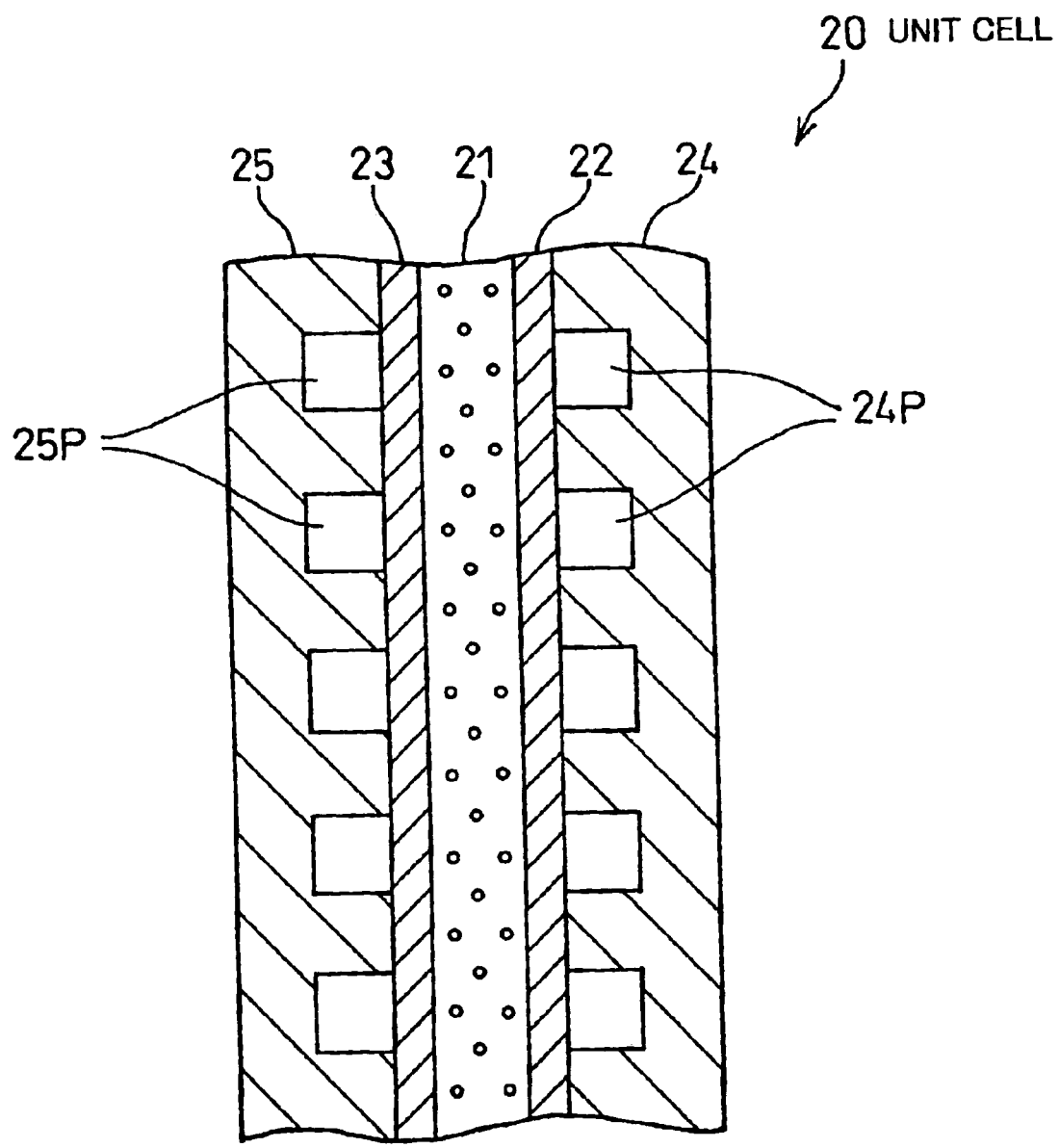
FIG. 1 is a sectional view schematically illustrating the structure of a unit cell 20, which is a fundamental unit in a stack of fuel cells 10 embodying the present invention.

Fuel cells manufactured according to a method embodying the present invention consist of a number of unit cells, which are laid one upon another to form a stack structure. FIG. 1 is a sectional view schematically illustrating the structure of a unit cell 20, which is a fundamental unit in a stack of fuel cells 10 (see FIG. 3). As shown in the drawing, the unit cells 20 includes a polymer electrolyte film (hereinafter simply referred to as the electrolyte film) 21, an anode 22, a cathode 23, and separators 24 and 25.

The anode 22 and the cathode 23 are gas diffusion electrodes that are disposed across the electrolyte film 21 to form a sandwich-like structure. The separators 24 and 25 are further disposed across the sandwich-like structure and connected respectively with the anode 22 and the cathode 23 to form flow paths of gaseous fuel and oxidizing gas. Flow paths of gaseous fuel 24P are formed between the anode 22 and the separator 24, whereas flow paths of oxidizing gas 25P are formed between the cathode 23 and the separator 25.

Although the separators 24 and 25 shown in FIG. 1 form the flow paths only on the single faces thereof. In the actual fuel cells, however, ribs are formed on both sides of each separator. One face of each separator is joined with the anode 22 of the unit cell 20 to form the flow paths of gaseous fuel 24P, whereas the other side of the separator is joined with the cathode 23 of an adjoining unit cell 20 to form the flow paths of oxidizing gas 25P. The separators 24 and 25 are connected with the gas diffusion electrodes to form gas flow paths, and separate the flow of gaseous fuel in each unit cell from the flow of oxidizing gas in an adjoining unit cell. A number of unit cells 20 are laid one upon another to form a stack structure. Two separators located on the respective ends of the stack structure have ribs only on their single faces that are in contact with the gas diffusion electrodes.

The electrolyte film 21 is a proton-conducting ion exchange film composed of a solid polymer material, such as a fluororesin, and shows the good electrical conducting ability in the wet state. A Nafion film (ex du Pont) is used for the electrolyte film 21 in this embodiment. Platinum or a platinum alloy functioning as the catalyst is applied on the surface of the electrolyte film 21. The method of applying the catalyst on the electrolyte film 21 in this embodiment prepares carbon particles with platinum or a platinum alloy carried thereon as the catalyst, disperses the catalyst-carrying carbon particles into an appropriate organic solvent, adds a specific amount of an electrolytic solution to the dispersion to yield a paste, and prints the paste on the electrolyte film 21 by screen printing.

The carbon particles with the platinum catalyst carried thereon are prepared in the following manner. The procedure first adds sodium thiosulfate to aqueous chloroplatinic acid to yield an aqueous solution of platinum sulfite complex. Hydrogen peroxide is added dropwise to the aqueous solution of platinum sulfite complex with stirring, so as to make colloidal platinum particles deposit in the aqueous solution. Carbon black, for example, Vulcan XC-72 (trade mark by Cabot Corp., the USA) or Denka Black (trade mark by Denki Kagaku Co., Ltd., Japan), is added as a carrier to the aqueous solution with stirring. The colloidal platinum particles then adhere to the surface of the carbon black.

The carbon black with platinum particles adhering thereto is filtered with suction or under pressure, repeatedly washed with deionized water, and completely dried at room temperature. The aggregate of carbon black formed in the drying process is ground to particles with a grinder, and heated at temperature of 250° C. to 350° C. in a hydrogen reducing atmosphere for about two hours. This reduces the platinum on the carbon black and completely removes the remaining chlorine, so as to complete the carbon particles with the platinum catalyst carried thereon.

The support density of the platinum on the carbon black (that is, the weight ratio of platinum to carbon) is regulated by varying the ratio of the amount of chloroplatinic acid to the amount of carbon black. This gives the platinum catalyst of an arbitrary support density. Any method other than the method discussed above may be applied to prepare the platinum catalyst, as long as the method can ensure the sufficient catalytic activity.

Although the above description refers to the platinum catalyst, the platinum catalyst may be replaced with a platinum alloy catalyst, which includes platinum as a first component and one or a plurality of other metals selected among the group including ruthenium, nickel, cobalt, indium, iron, chromium, and manganese as a second component.

In this embodiment, the anode 22 and the cathode 23 are made of carbon cloth, which is woven of carbon fibers. In accordance with another application, the anode 22 and the cathode 23 may be made of carbon paper or carbon felt, which is composed of carbon fibers.

The electrolyte film 21 is integrated with the anode 22 and the cathode 23 by hot pressing. A concrete procedure interposes the electrolyte film 21 with the platinum catalyst applied thereon between the anode 22 and the cathode 23 and hot presses the laminate at the temperature of 120 to 130° C. The electrolyte film 21 may be integrated with the anode 22 and the cathode 23 by adhesion, instead of by hot pressing. A concrete procedure in this case bonds the electrolyte film 21 to each gas diffusion electrode with a solution of proton-conducting solid polymer (for example, a Nafion solution, ex Aldrich Chemical Inc). The solution of proton-conducting solid polymer functions as an adhesive in the course of hardening and securely bonds the electrolyte film 21 to each gas diffusion electrode.

The separators 24 and 25 are made of a gas-impermeable conducting material, for example, gas-impermeable dense carbon obtained by compressing carbon. Each of the separators 24 and 25 has a plurality of ribs formed in parallel on both faces thereof, and is connected with the surface of the anode 22 in each unit cell to form the flow paths of gaseous fuel 24P while being connected with the surface of the cathode 23 in an adjoining unit cell to form the flow paths of oxidizing gas 25P as described previously. The orientation of the ribs formed on one face of each separator may not be arranged parallel to the orientation of the ribs formed on the other face thereof, but may be arranged perpendicular to or at a predetermined angle to the orientation of the ribs formed on the other face thereof. Although the ribs are formed as parallel grooves in this embodiment, these ribs may have any other configuration that enables supplies of gaseous fuel and oxidizing gas to be fed to the corresponding gas diffusion electrodes.

Figure 2:
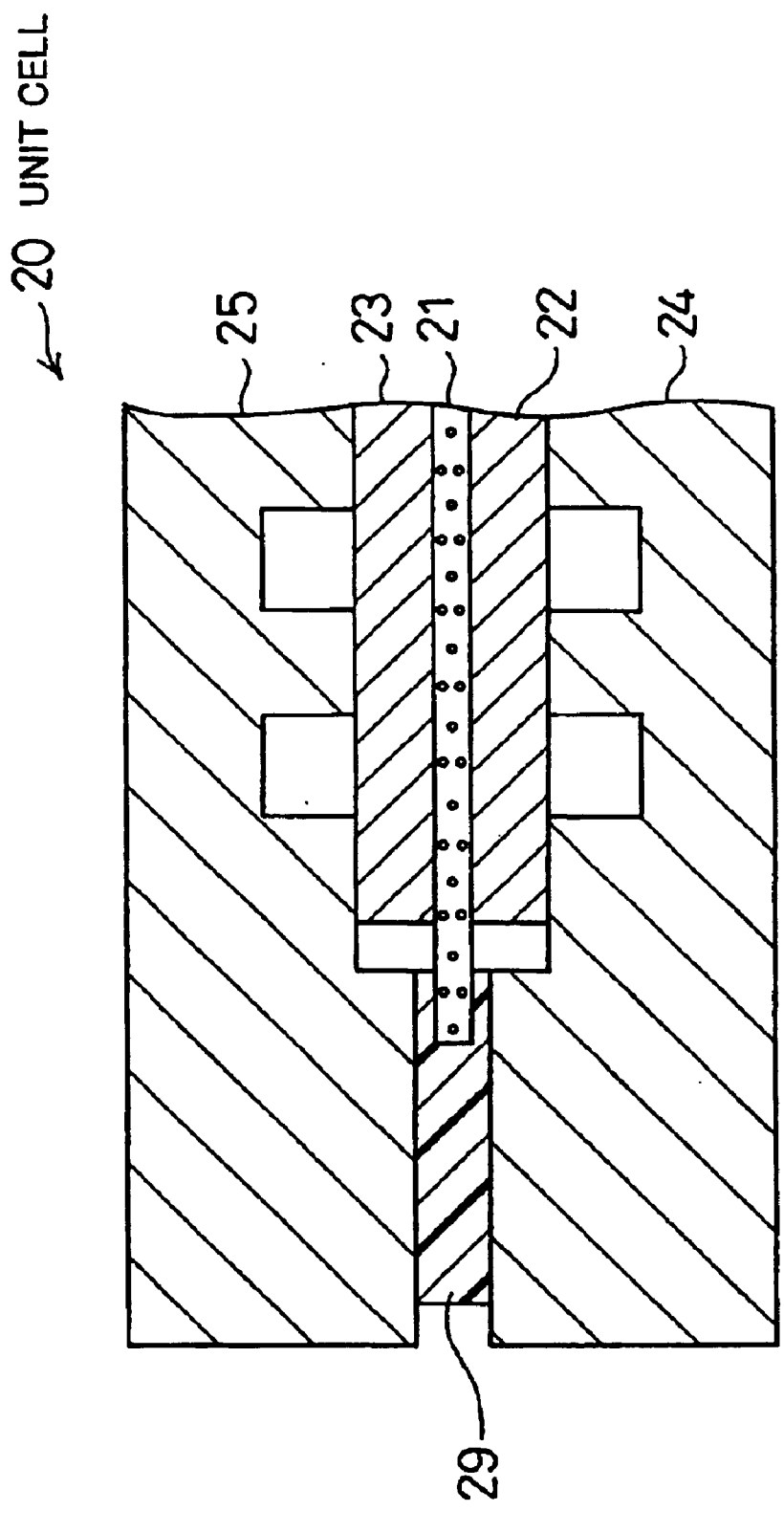
FIG. 2 is a sectional view showing the structure of a joint body to effect a gas seal in the unit cell 20.

FIG. 2 is a sectional view illustrating one end of the unit cell 20, where the electrolyte film 21 is joined with the separators 24 and 25. The electrolyte film 21 is bonded to the separators 24 and 25 with an adhesive. A concrete procedure applies the adhesive on specific areas of the separators 24 and 25, which are directly bonded to the electrolyte film 21, and assembles the unit cell 20. This causes an adhesive layer 29 to form and cover a specific portion of the electrolyte film 21 that protrudes from the gas diffusion electrodes, and completes a joint body.

In the unit cell 20 of the above structure, a supply of gaseous fuel containing hydrogen is flown through the flow paths of gaseous fuel 24P formed between the anode 22 and the separator 24, whereas a supply of oxidizing gas containing oxygen is flown through the flow paths of oxidizing gas 25P formed between the cathode 23 and the separator 25. The following electrochemical reactions accordingly proceed on the anode 22 and the cathode 23, so as to convert the chemical energy directly into electrical energy:

Reaction on cathode (oxygen electrode):

$$2H^+ + 2e^- + (\tfrac{1}{2})O_2 \rightarrow H_2O$$

Reaction on anode (fuel electrode):

$$H_2 \rightarrow 2H^+ + 2e^-$$

Figure 3:
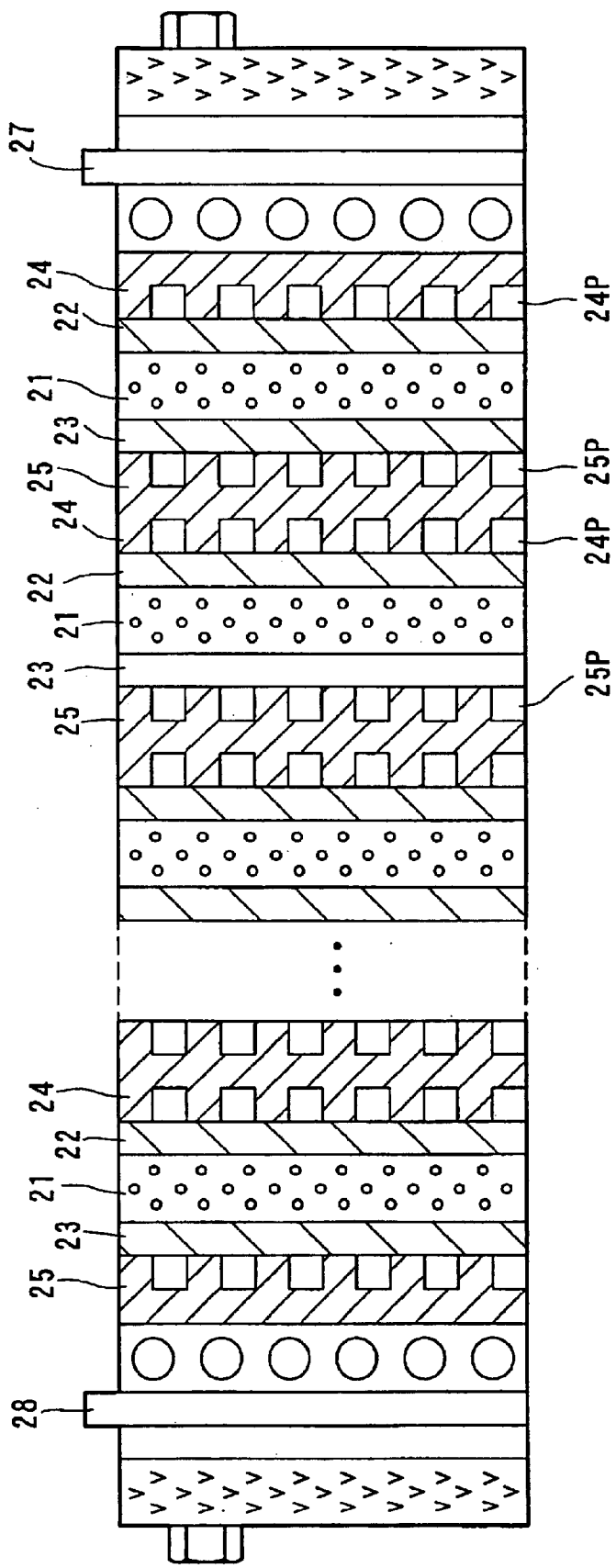
FIG. 3 is a sectional view schematically illustrating the structure of the stack of fuel cells 10 assembled by laying the unit cells 20 one upon another.

The stack of fuel cells 10 are assembled from a number of the unit cells 20 having the structure discussed above. As shown in FIG. 3, plural sets (for example, 100 sets) of the separator 24, the anode 22, the electrolyte film 21, the cathode 23, and the separator 25 are laid one upon another in this sequence to form a stack structure. Electricity-collecting plates 27 and 28, which are made of dense carbon or copper, are located across the stack structure. The separators 24 and 25 have the identical configuration having the plurality of ribs on both faces thereof as described previously. In the drawing of FIG. 3, as a matter of convenience, the right half of each separator for forming the flow paths of gaseous fuel 24P is expressed as the separator 24, whereas the left half of each separator for forming the flow paths of oxidizing gas 25P is expressed as the separator 25.

Figure 4:
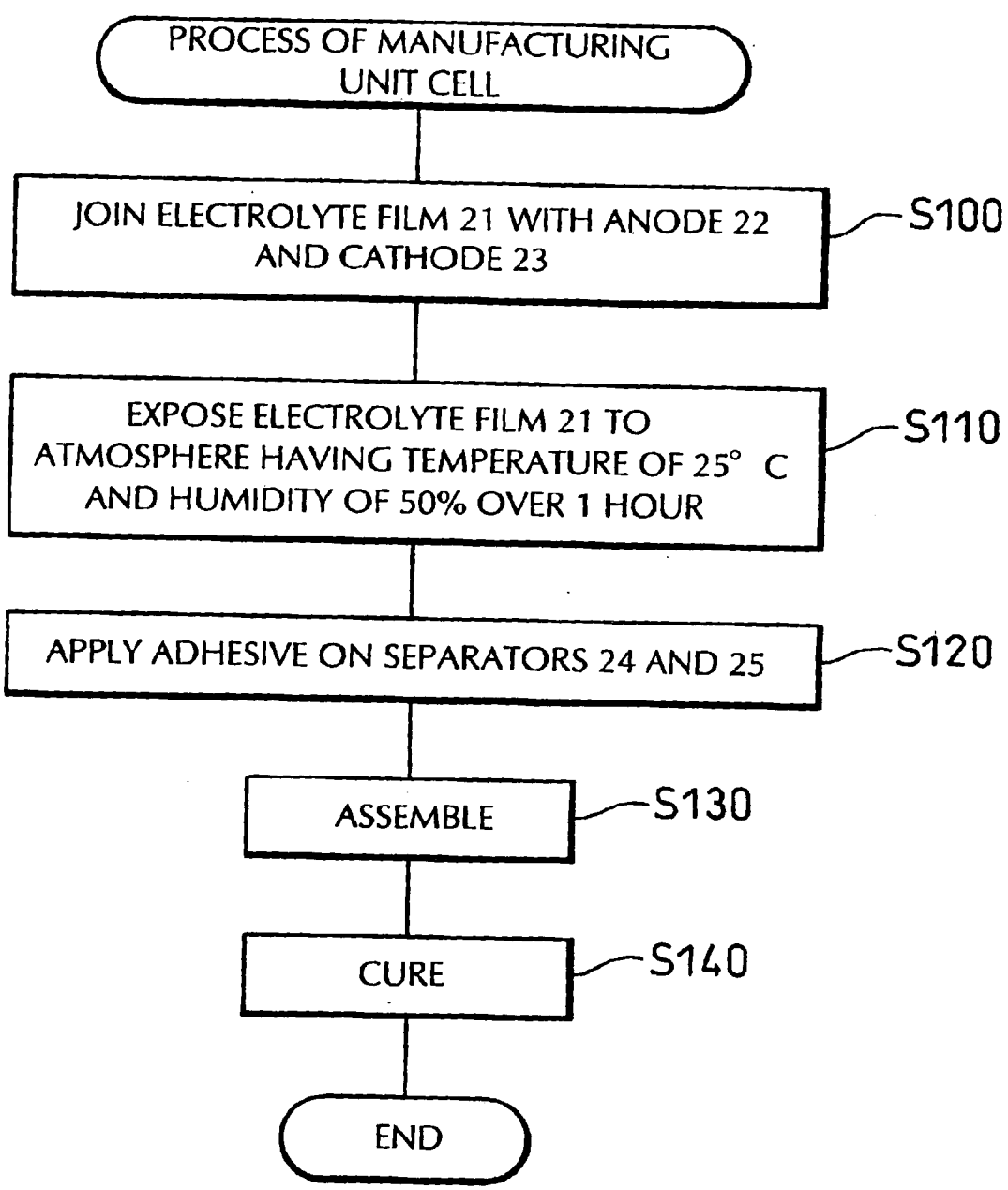
FIG. 4 is a flowchart showing a method of manufacturing the unit cell 20.

The concrete procedure of manufacturing the unit cell 20 is described more in detail with the flowchart of FIG. 4. The method first interposes the electrolyte film 21 between the anode 22 and the cathode 23 to form a sandwich-like structure and integrates the sandwich-like structure by hot pressing at the temperature of 120 to 130° C. and under the pressure of 8,000 to 12,000 KPa at step S100.

The method then exposes the electrolyte film 21 joined with the anode 22 and the cathode 23 to an atmosphere having the temperature of 25° C. and the humidity of 50% (relative humidity: the term 'humidity' hereinafter implies the relative humidity) at step S110. Although the atmosphere has the humidity of 50% in this embodiment, the atmosphere may have another predetermined humidity of less than 50%.

The method then applies an adhesive on specific areas of the separators 24 and 25, which are directly joined with the electrolyte film 21, at step S120. The adhesive used here is a modified rubber adhesive including a mixture of epoxy resin and modified silicone. The adhesive has the modulus of elasticity of not greater than 10 MPa or more preferably not greater than 5 MPa after cure, and the durometer A hardness of not greater than 90 or more preferably not greater than 80 after cure. The adhesive contains 2% resin beads of 50 µm in diameter for regulating the thickness of the adhesive layer.

The method subsequently disposes the separators 24 and 25 across the electrolyte film 21 joined with the anode 22 and the cathode 23 to assemble the unit cell 20 at step S130. This causes the adhesive layer 29 to form and cover a specific portion of the electrolyte film 21 that protrudes from the anode 22 and the cathode 23 as shown in FIG. 2. The unit cell 20 thus assembled is left to stand at room temperature for three days, in order to cure the adhesive layer 29 at step S140. This completes the unit cell 20.

The unit cell 20 was tested for evaluation of the adhesive strength between the electrolyte film 21 and the separators 24 and 25. Test pieces for the adhesive strength test were prepared in the following manner.

A plurality of electrolyte films of Nafion 115 (ex du Pont, EW1100 g/mol) were exposed to an atmosphere having the temperature of 25° C. and the humidity of substantially 0% over one hour. The electrolyte films were further exposed respectively to the atmospheres having the humidity varied sequentially from 0% to 100% by every 10% under the same conditions. This gave the electrolyte films having different water content λ as the test pieces.

Figure 5:
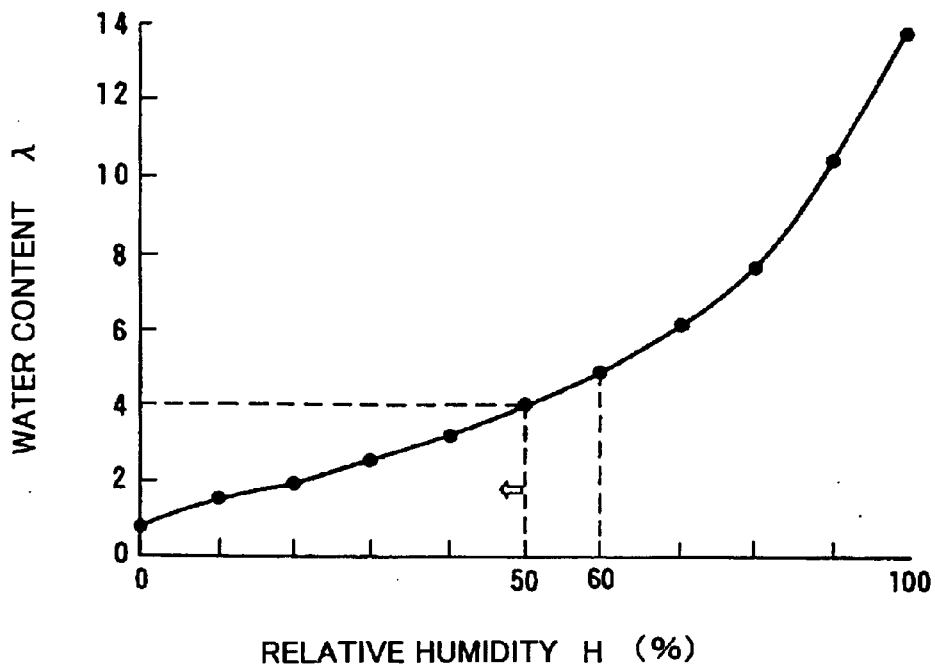
FIG. 5 is a graph showing the water content $\lambda$ of an electrolyte film plotted against the relative humidity H of an atmosphere, to which the electrolyte film is exposed.

The water content λ of each electrolyte film was measured against the relative humidity H of the atmosphere, to which the electrolyte film was exposed. The results are shown in the graph of FIG. 5. As clearly seen in FIG. 5, the water content λ gradually increases almost in proportion to an increase in relative humidity H and abruptly increases after the relative humidity H of 60%. The value of the water content λ shown in FIG. 5 is expressed as the molar fraction of $H_2O$.

The adhesive strength test was performed for the plurality of electrolyte films having the different water content λ in the following manner. The adhesive used for joining the electrolyte film 21 with the separators 24 and 25 in the embodiment was applied on a carbon plate, which is made of the same material as that of the separators 24 and 25. The adhesive contained resin beads of 50 µm in diameter to attain the same thickness of the adhesive layer as that of the embodiment. Each electrolyte film was bonded to the carbon plate via the adhesive layer. According to the procedure of the embodiment, each joint body of the carbon plate with the electrolyte film was left to stand at room temperature for three days, in order to cure the adhesive layer. A 180-degree peeling strength test was carried out for the respective joint bodies thus obtained.

Figure 6:
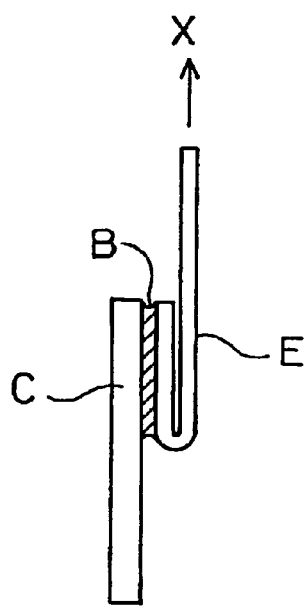
FIG. 6 shows a test for measuring the 180-degree peeling strength.

FIG. 6 shows a test for the 180-degree peeling strength. This test deflects an electrolyte film E in the opposite direction (at the angle of 180 degrees) and applies a tensile stress in a direction X with a testing machine (not shown). The test measures a stress or peeling strength when an adhesive layer B is destroyed and the electrolyte film E is peeled off a carbon plate C.

Figure 7:
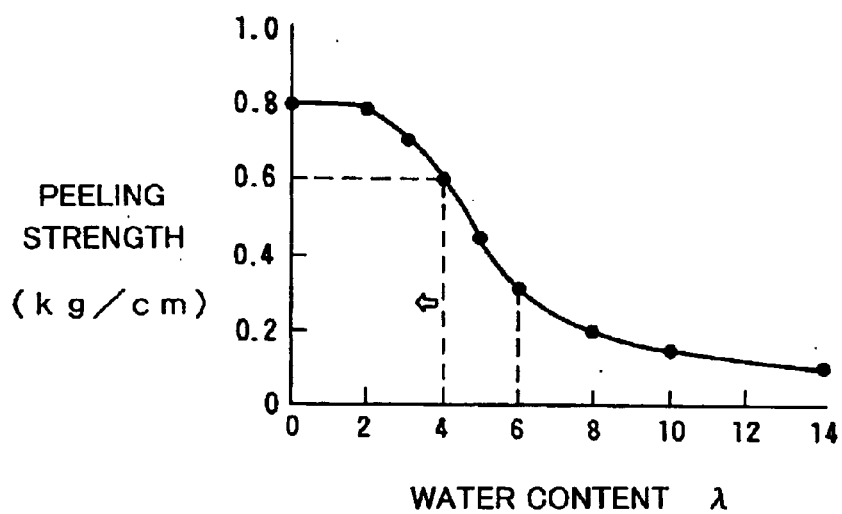
FIG. 7 is a graph showing the peeling strength plotted against the water content $\lambda$ of the electrolyte film.

The electrolyte films having the different water content λ were subjected to this test for the 180-degree peeling strength. The graph of FIG. 7 shows the observed peeling strength of the electrolyte film plotted against the water content λ. As clearly seen in FIG. 7, the peeling strength drastically increases when the water content λ of the electrolyte film is smaller than 6, and is over 0.6 kg/cm when the water content λ is not greater than 4. In general, the peeling strength of not greater than 0.3 to 0.4 kg/cm causes a gas leak and results in the poor reliability for the gas sealing property. The peeling strength of not less than 0.6 kg/cm, on the other hand, does not cause a gas leak and results in the high reliability for the gas sealing property.

This means that the electrolyte film having the water content λ of not greater than 4 (the weight ratio of not greater than 8%) ensures the sufficient adhesive strength of the electrolyte film to the carbon plate. The graph of FIG. 5 shows that the water content λ of not greater than 4 is realized in the atmosphere having the relative humidity H of not greater than 50%.

The procedure of the above embodiment exposes the electrolyte film 21 to the atmosphere having the humidity of 50% or less. According to the above results of the peeling strength test, the electrolyte film 21 has the water content λ of not greater than 4, which ensures the sufficient adhesive strength between the electrolyte film 21 and the separators 24 and 25 in the stack of fuel cells 10.

The fuel cells 10 manufactured according to the method of the embodiment thus have the high reliability for the gas sealing property between the electrolyte film 21 and the separators 24 and 25. Even in the case where the atmosphere has the high humidity of over 50% during manufacture, the fuel cells 10 manufactured according to the method of the embodiment are hardly affected by the humidity of the atmosphere and attain the high reliability for the gas sealing property between the electrolyte film 21 and the separators 24 and 25.

In the embodiment, the adhesive used for bonding the electrolyte film 21 to the separators 24 and 25 has the modulus of elasticity of not greater than 10 MPa or more preferably not greater than 5 MPa after cure and the durometer A hardness of not greater than 90 or more preferably not greater than 80 after cure. The following discusses the effects of the modulus of elasticity and the hardness of the adhesive after cure on the adhesive strength. Hereinafter the terms 'modulus of elasticity' and 'hardness' imply the modulus of elasticity and the hardness after cure.

A plurality of adhesives having the different modulus of elasticity were prepared by regulating the mixing ratio of the modified silicone to the epoxy resin. The modulus of elasticity decreases with an increase in mixing ratio of the modified silicone to the epoxy resin. The joint body of the electrolyte film E with the carbon plate C via each adhesive was subjected to the test for the 180-degree peeling strength discussed above. The graph of FIG. 8 shows the observed peeling strength plotted against the modulus of elasticity.

Figure 8:
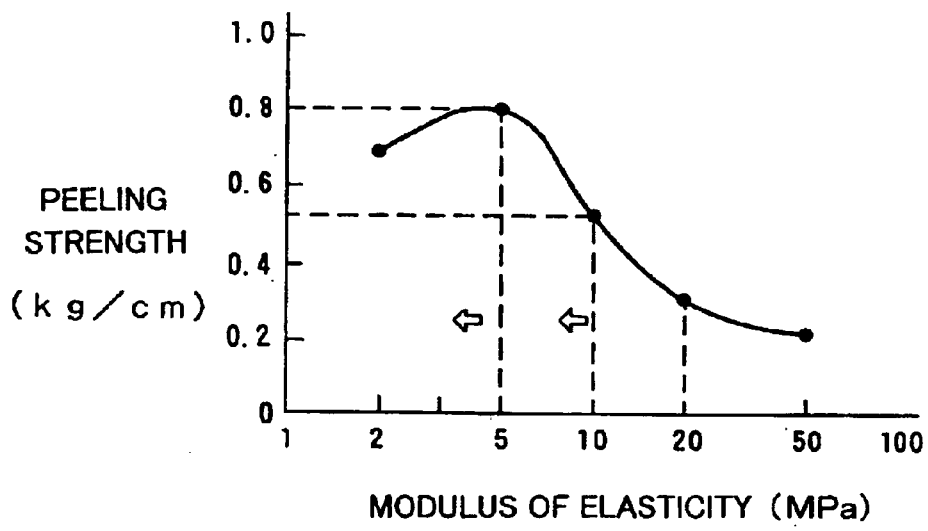
FIG. 8 is a graph showing the peeling strength plotted against the modulus of elasticity of an adhesive.

As clearly seen in FIG. 8, the peeling strength drastically increases when the modulus of elasticity of the adhesive is less than 20 MPa, and is over 0.5 kg/cm when the modulus of elasticity is not greater than 10 MPa. The peeling strength reaches the maximum of 0.7 to 0.8 kg/cm when the modulus of elasticity is not greater than 5 MPa. The peeling strength of not less than 0.5 kg/cm does not cause a gas leak and results in the high reliability for the gas sealing property.

The adhesive used in the embodiment has the modulus of elasticity of not greater than 10 MPa or more preferably not greater than 5 MPa after cure. This means that the fuel cells 10 ensure the sufficient adhesive strength between the electrolyte film 21 and the separators 24 and 25.

The effect of the hardness of the adhesive was measured in the following manner. A plurality of adhesives having the different hardness were prepared by regulating the mixing ratio of the modified silicone to the epoxy resin. The hardness decreases with an increase in mixing ratio of the modified silicone to the epoxy resin. The joint body of the electrolyte film E with the carbon plate C via each adhesive was subjected to the test for the 180-degree peeling strength discussed above. The graph of FIG. 9 shows the observed peeling strength plotted against the durometer A hardness.

Figure 9:
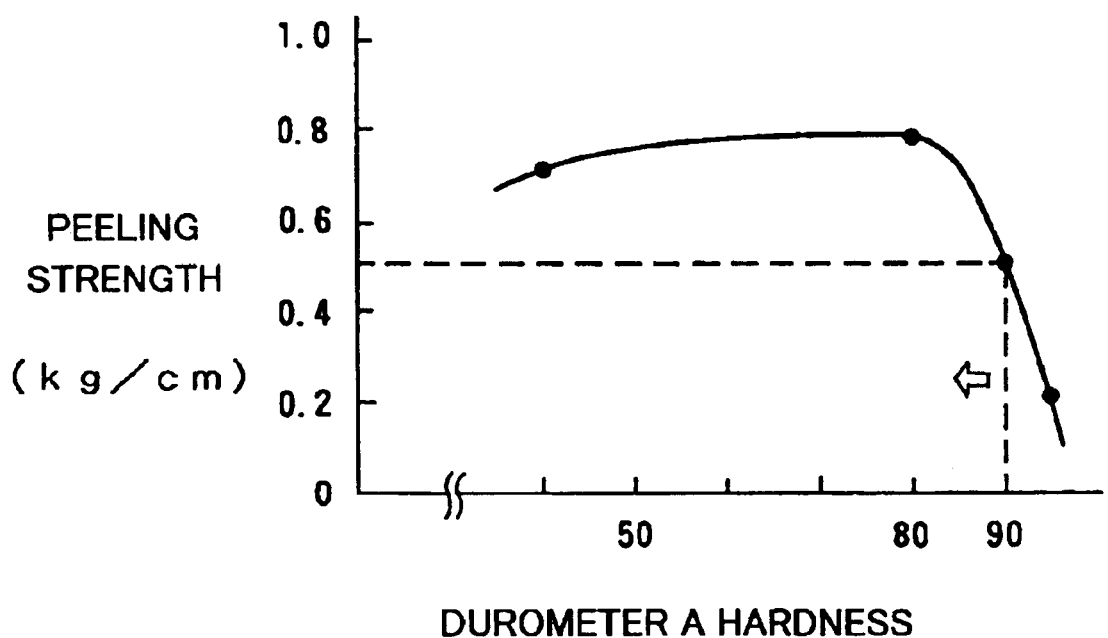
FIG. 9 is a graph showing the peeling strength plotted against the hardness of the adhesive.

As clearly seen in FIG. 9, the peeling strength drastically increases to the value of over 0.5 kg/cm when the durometer A hardness of the adhesive is not greater than 90. The peeling strength reaches the maximum of 0.7 to 0.8 kg/cm when the durometer A hardness is not greater than 80. As described previously, the peeling strength of not less than 0.5 kg/cm does not cause a gas leak and results in the high reliability for the gas sealing property.

The adhesive used in the embodiment has the durometer A hardness of not greater than 90 or more preferably not greater than 80 after cure. This means that the fuel cells 10 ensure the sufficient adhesive strength between the electrolyte film 21 and the separators 24 and 25.

The fuel cells 10 of the embodiment satisfy both the conditions for the modulus of elasticity and the hardness of the adhesive and thereby ensure the sufficient adhesive strength between the electrolyte film 21 and the separators 24 and 25. This was confirmed by the various tests. This is attributable to the following reason. The adhesive satisfying the condition of the modulus of elasticity or the condition of the hardness enables the adhesive layer to be readily expanded and contracted even after cure. When a tensile stress is applied to stretch the polymer electrolyte film, the adhesive layer can thus follow the stretch. This arrangement effectively prevents the polymer electrolyte film from being hardened or broken and protects the adhesive layer from the damage.

As discussed above, the method of the embodiment ensures the high peeling strength between the electrolyte film 21 and the separators 24 and 25 and gives the fuel cells having the high reliability for the gas sealing property even in the service environment of a remarkable humidity change. The method of the embodiment also enables the fuel cells having the high reliability for the gas sealing property to be manufactured even under the condition of high humidity.

Namely the fuel cells 10 manufactured according to the method of the embodiment have the high reliability for the gas sealing property both during manufacture and in the service environment.

In the above embodiment, the adhesive satisfies both the condition of the modulus of elasticity and the condition of the hardness. The adhesive that satisfies only either one of these two conditions, however, ensures the sufficient adhesive strength between the electrolyte film 21 and the separators 24 and 25 and attains the high reliability for the gas sealing property. One modified produce omits the process of regulating the water content $\lambda$ of the electrolyte film 21 and manufactures the fuel cell only by taking into account the modulus of elasticity and the hardness of the adhesive.

In the above embodiment, the modified rubber adhesive including the mixture of epoxy resin and modified silicone is used for the adhesive to bond the electrolyte film 21 to the separators 24 and 25. Another adhesive may, however, be used for the same purpose, as long as the adhesive has the modulus of elasticity of not greater than 10 MPa or more preferably not greater than 5 MPa after cure and/or the durometer A hardness of not greater than 90 or more preferably not greater than 80 after cure.

Although the adhesive contains the resin beads for regulating the thickness of the adhesive layer in the above embodiment, the adhesive may not contain any resin beads.

The present invention is not restricted to the above embodiment or its modifications, but there may be many other modifications, changes, and alterations without departing from the scope or spirit of the main characteristics of the present invention.

What is claimed is:

1. A method of manufacturing a fuel cell comprising a layer stack of unit cells each including a polymer electrolyte film and gas diffusion electrodes, said method comprising the steps of:

causing the polymer electrolyte film to have a water content of not greater than 4, which is expressed as a molar fraction of $H_2O$;

providing a gas-impermeable dense carbon separator which forms a gas flow path with the surface of each diffusion electrode; and bonding the polymer electrolyte film directly to the carbon separator with an adhesive having a modulus of elasticity of not greater than 10 MPa after cure.

2. A method in accordance with claim 1, wherein the step of bonding the polymer electrolyte film comprises placing the adhesive having a durometer A hardness of not greater than 90 after cure.

3. A method in accordance with claim 1, wherein the step of bonding the polymer electrolyte film comprises providing a pair of carbon separators that are arranged across a pair of gas diffusion electrodes, between which the polymer electrolyte film is interposed.

4. A method in accordance with claim 1, wherein the step of bonding the polymer electrolyte film comprises placing the adhesive being a modified rubber adhesive comprising a mixture of epoxy resin and modified silicone.

5. A method in accordance with claim 1, wherein the step of bonding the polymer electrolyte turn comprises placing the adhesive including resin beads of a predetermined diameter.

6. A method of manufacturing a fuel cell comprising a layer stack of unit cells each including a polymer electrolyte film and gas diffusion electrodes, said method comprising the steps of:

providing a gas-impermeable dense carbon separator which forms a gas flow path with the surface of each diffusion electrode;

providing an adhesive having a modulus of elasticity of not greater than 10 MPa after cure; and bonding the polymer electrolyte film directly to the carbon separator with the adhesive.

7. A method in accordance with claim 6, wherein the step of bonding the polymer electrolyte film comprises placing the adhesive having a durometer A hardness of not greater than 90 after cure.

8. A method in accordance with claim 6, wherein the step of bonding the polymer electrolyte film comprises providing a pair of carbon separators that are arranged across a pair of gas diffusion electrodes, between which the polymer electrolyte film is interposed.

9. A method in accordance with claim 6, wherein the step of providing the adhesive comprises providing the adhesive being a modified rubber adhesive comprising a mixture of epoxy resin and modified silicone.

10. A method in accordance with claim 6, wherein the adhesive includes resin beads of a predetermined diameter.

11. A fuel cell, comprising:

a layer stack of unit cells each including a polymer electrolyte film and gas diffusion electrodes;

a gas-impermeable dense carbon separator which forms a gas flow path with the surface of each diffusion electrode; and a polymer electrolyte film that has a water content of not greater than 4, which is expressed as a molar fraction of $H_2O$, and is bonded directly to the carbon separator with an adhesive having a modulus of elasticity of not greater than 10 MPa after cure.

12. A fuel cell, comprising:

a layer stack of unit cells each including a polymer electrolyte film and gas diffusion electrodes;

a gas-impermeable dense carbon separator which forms a gas flow path with the surface of each diffusion electrode; and an adhesive that is used to bond the polymer electrolyte film directly to the carbon separator and has a modulus of elasticity of not greater than 10 MPa after cure.

13. A fuel cell, comprising:

a layer stack of unit cells each including a polymer electrolyte film and gas diffusion electrodes;

a gas-impermeable dense carbon separator which forms a gas flow path with the surface of each diffusion electrode; and an adhesive that is used to bond the polymer electrolyte film directly to the carbon separator and has a durometer A hardness of not greater than 90 after cure.

* * * * *